US005944921A

United States Patent [19]

Cumino et al.

[11] Patent Number: 5,944,921

[45] Date of Patent: Aug. 31, 1999

[54] MARTENSITIC STAINLESS STEEL HAVING HIGH MECHANICAL STRENGTH AND CORROSION RESISTANCE AND RELATIVE MANUFACTURED ARTICLES

[75] Inventors: Giuseppe Cumino, Dalmine; Massimo Barteri, Rome, both of Italy

[73] Assignee: Dalmine S.p.A., Dalmine, Italy

[21] Appl. No.: 08/972,870

[22] PCT Filed: May 28, 1996

[86] PCT No.: PCT/EP96/02289

§ 371 Date: Nov. 11, 1997

§ 102(e) Date: Nov. 11, 1997

[87] PCT Pub. No.: WO96/38597

PCT Pub. Date: Dec. 5, 1996

[30] Foreign Application Priority Data

May 31, 1995 [IT] Italy ................................ MI95A1133

[51] Int. Cl.[6] .............................. C22C 38/44; C21D 8/00

[52] U.S. Cl. ............................................ 148/325; 148/608

[58] Field of Search .............................. 420/67; 148/608, 148/325

[56] References Cited

FOREIGN PATENT DOCUMENTS

| | | |
|---|---|---|
| 0481377 | 4/1992 | European Pat. Off. . |
| 0594935 | 10/1992 | European Pat. Off. . |
| 565117 | 10/1993 | European Pat. Off. . |
| 0649915 | 4/1995 | European Pat. Off. . |
| 2348275 | 11/1977 | France . |
| 4-173926 | 6/1992 | Japan . |
| 6-287635 | 10/1994 | Japan . |
| 7-048656 | 2/1995 | Japan . |
| 7-062499 | 3/1995 | Japan . |
| 832562 | 4/1960 | United Kingdom . |

*Primary Examiner*—Deborah Yee
*Attorney, Agent, or Firm*—Hedman, Gibson & Costigan, P.C.

[57] ABSTRACT

A supermartensitic stainless steel having high mechanical strength and corrosion resistance showing the following percentage composition C≦0.05; Cr 12–15; Ni 4–7; Mo 1.5–2; N 0.06–0.12; Mn 0.5–1; Cu<0.3; P<0.02; S≦0.005; Al<0.02; Si≦1; the rest being iron and minor impurities, with the further requirement that the percentages of Cr, Mo and N satisfy the following formula: (Cr+3.3 Mo+16 N)≧19. Said steel allows to obtain manufactured articles having excellent mechanical strength and corrosion resistance characteristics.

6 Claims, No Drawings

MARTENSITIC STAINLESS STEEL HAVING HIGH MECHANICAL STRENGTH AND CORROSION RESISTANCE AND RELATIVE MANUFACTURED ARTICLES

FIELD OF THE INVENTION

The present invention refers to a supermartensitic stainless steel having high mechanical strength and corrosion resistance deriving from its composition and from the thermal treatment to which its manufactured articles are submitted during their working phases.

The invention also concerns the production process of the manufactured articles, in particular pipes for drilling, production and pipage in the hydrocarbons field.

PRIOR ART

A particular application field of the stainless steels is the pipes for drilling, production and pipage in the hydrocarbons field one, where it is well known to resort to compositions of steels guaranteeing the necessary mechanical strength and corrosion resistance. However, the more and more frequent exploitation of deposits of hydrocarbons of the so called acid, or sour kind, owing to a high content in sulphidric acids and/or of carbon dioxide, often even in presence of high contents in chlorides and at high temperatures, makes more and more difficult the choice of suitable materials.

In this connection, the various oil companies and the planning societies in the attempt to prevent to the outmost the accidents deriving from possible breakings in the working cycle of the pipes, which would cause great production losses and damages to the environment, fixed very rigorous limits of mechanical strength and corrosion resistance of the materials to employ.

At present stainless steels, either of biphasic or austeno-ferritic kind, where are simultaneously present the two ferritic and austenitic phases in such ratios among them to give interesting properties to the steel from the point of view of the mechanical or corrosion resistance either austenitic kind homogeneous steels, which however are even more expensive owing to the high amount of components which must be added to the basic alloy, are on the market and used.

The Applicant too, operating since many years in the production of pipes for drilling and for the production and pipage of hydrocarbons, has described and claimed in the Patent Application EP 93106675.7. a super-duplex kind steel to be used for manufactures employable in acid environments. An important market section in the drilling pipes and in the production and pipage of hydrocarbons, is constituted by that one using pipes in martensitic steels. Said pipes are substantially employed in "sweet" environments, that is characterized by high contents in carbon dioxide and chlorides with absence or presence in traces only of hydrogen sulfide.

The martensitic steels have a much lower cost than other stainless steels and their use finds an increasing favour; unfortunately their use is limited from the cracking sensitivity in presence of hydrogen sulfide.

In order to overcome this limitation of the martensitic steels, either the alligation with chromium amounts higher than 13%, or combinations of chromium and molybdenum have been experimented obtaining encouraging results. Sometimes nickel in such amounts to guarantee the total austenitization, necessary for the complete transformation in martensite has been also added.

In the present text, steels having a chromium content higher than 14% by weight, or a combination Cr/Mo in which Cr is >12% and Mo is >1%, if necessary with the addition of nickel in amounts higher than 0.5% are pointed out with the adjective "supermartensitic", the presence of said metallic elements however being such as to guarantee a complete transformation of the steel in martensitic one, after the cooling subsequent to the austenization treatment.

In the technical-patent literature informations are also found relative to the influence of other elements on the behavior of the martensitic stainless steels.

By way of example, we remember the Patent Application JP-A-3120337/91 of May 22, 1991 where the influence of the amounts of Mo, Mn and S in a Ni/Cr austenitic steel in order to increase its corrosion resistance capacity is discussed. In particular a maximum limit equal to 0.5% of Mn has been pointed out, as the presence of this element in the steel decreases the corrosion resistance capacity owing to the pitting of the latter. Reducing in the steel the Mn percentage, the sulphur content which otherwise would affect in negative way the forgeability of the steel must be at the same time reduced to very low values (lower than 0.002% against the normal value from 0.002% to 0.005% of the austenitic steels).

Another element whose percentage in the steel is considered critical is nitrogen, because the increase in cracking sensitivity of the steel by hydrogen sulfide corrosion is ascribed to amounts higher than 0.002% of nitrogen. Because of this situation, it is easily realized why the technicians of the field go on studying the problem in the attempt to find new kinds of steel which are more interesting and useful either as a set of desired characteristics or as production costs.

DETAILED DESCRIPTION OF THE INVENTION

The present invention is based on an intuition of the authors, namely that it was possible to modify the mechanical strength and corrosion resistance of a supermartensitic kind steel acting only on the amount of the elements present in lower amount in the composition, without substantially modifying the content of the main elements and combining these composition modifications, apparently minor, to a thermo-mechanical transformation treatment of the steel obtained in semifinished products and subsequently in manufactured articles, particularly in pipes, using a process carried out in carefully controlled conditions.

The Applicant found that treating the manufactured article in supermartensitic steel according to the invention by the thermal treatment, object of the present invention too, it is possibile to preserve the sulphur percentage of the steels in the normal ranges from 0.002% to 0.005% and the amount of Mn to values ranging from 0.5% to 1%, controlling the content of C to values lower than 0.05% and the nitrogen content from 0.06% to 0.12%. The rigorous control of the quantities of C and N present in the steel allow to keep the content of S higher without compromising the forgeability of the steel. A steel having the composition according to the invention is self-hardening and turns in martensitic one by simple cooling in air from a temperature higher than the austenite/ferrite transformation point.

The hardening in water, not being necessary as well, may be naturally used to obtain the transformation of the steel. The steel according to the invention may have an excellent mechanical strength after the tempering thermal treatment which induces the precipitation of chromium carbides, has good toughness and it is resistant to pitting corrosion and to stress corrosion in environments in which hydrogen sulfide, chlorides and carbon dioxide, even under pressure, are present provided that the further condition that the percentages of Cr, Mo and N satisfy the following formula: (Cr+3.3 Mo+16 N)≧19 is satisfied.

Particularly the pipes, rolled or extruded, made with a steel according to the invention are resistant to stress corrosion at temperatures even higher than 150° C. in environments containing hydrogen sulfide with partial pressure to 0.50 bar and with sodium chloride contents to 200 g/l, conditions which are more severe than those normally found in a great part of the acid oil wells, even to high depth.

The present invention also concerns the production process of forged manufactures, in particular of seamless tubes.

According to a fundamental characteristic of the present invention, the process for the production of manufactures in supermartensitic steel is characterized by the following steps:

(a) preparing a ingot, or a continuous casting bar, having the following ponderal per cent composition: C≦0.05; Cr 12–15; Ni 4–7; Mo 1.5–2; N 0.06–0.12; Mn 0.5–1; Cu<0.3; P<0.02; S≦0.005; Al<0.02; Si≦1; the rest being iron and minor impurities, with the further requirement that the percentages of Cr, Mo and N satisfy the following formula: (Cr+3.3 Mo+16 N)≧19;

(b) carrying out a first hot deformation by forging or rolling of the ingot or the bar in order to obtain a semifinished product;

(c) warming said semifinished product to a temperature ranging from 1,250 to 1,350° C., deform it again by hot rolling or by extrusion until obtaining a product having desired shape and size;

(d) submitting the manufactured article, optionally after cooling to room temperature, to austenization thermal treatment, keeping it at a temperature ranging from 880° C. to 980° C. for a time period ranging from 15 to 90 minutes;

(e) cooling the manufacture to a temperature lower than 90° C. and then submit it to tempering thermal treatment at a temperature ranging from 560° C. to 670° C. for a time ranging from 30 to 300 minutes.

The cooling operations of the steps (d) and (e) may be carried out either by cooling in air or in water.

The following examples are useful for better defining the invention and to point out the influence of the nitrogen content on the behavior of the steel obtained and treated according to what has been above described.

EXAMPLE 1

A steel ingot having the following ponderal per cent composition: C 0.02; Cr 13.29; Ni 4.75; Mo 1.62; N 0.08; Mn 0.73; Si 0.27; P 0.014; S<0.002; the rest being iron and minor impurities, was prepared. The obtained ingot was hot-worked by forging to bars having a diameter equal to 280 mm. One of the obtained bars was warmed to 1280° C., hot rolled till forming a pipe having a diameter equal to 177.8 mm and thickness equal to 10.36 mm.

The obtained pipe was left to cool in the air to room temperature and then submitted to austenization taking it to a temperature equal to 920° C. and keeping it to said temperature for 80 minutes, followed by air cooling and subsequent tempering thermal treatment at a temperature equal to 620° C., maintaining it to said temperature for 40'.

The so obtained pipe was submitted to corrosion and stress corrosion test according to the standards ASTM G-31: general corrosion test in NaCl solution 200 g/l with partial pressure of $H_2S$ equal to 500 mbar and temperature equal to 150° C. An average corrosion velocity after 500 hours equal to 0.056 mm/year was measured.

NACE TM-01-77-90—method A: in a modified solution NaCl 50 g/l and acetic acid 0.5% with a partial pressure of $H_2S$ equal to 50 mbar. A threshold stress was determined, beyond which stress corrosion cracks occur, equal to 85% of the yield stress.

EXAMPLE 2 (Comparison)

A steel pipe was prepared acting as it is described in the Example 1, except for a steel having the following composition: C 0.02; Cr 11.95; Ni 5.50; Mo 2.06; N 0.04; Mn 0.45; Si 0.18; P 0.019; S<0.002; the rest being iron and minor impurities, was used.

The corrosion and stress corrosion tests carried out on the pipe obtained according to the standards ASTM G-31 and NACE TM-01-77-90 gave respectively a corrosion value equal to 0.146 mm/year and a threshold stress value equal to 30% of the yield stress.

We claim:

1. Supermartensitic steel having the following ponderal per cent composition: C≦0.05; Cr 12–15; Ni 4–7; Mo 1.5–2; N 0.06–0.12; Mn 0.5–1; Cu<0.3; P<0.02; S≦0.005; Al<0.02; Si≦1; the residue being iron and minor impurities, with the further requirement that the percentages of Cr, Mo and N satisfy the following formula: (Cr+3.3 Mo+16 N)≧19.

2. Process for the production of supermartensitic steel manufactured articles characterized by the following steps:

(a) preparing a ingot, or a continuous casting bar, having the following ponderal per cent composition: C≦0.05; Cr 12–15; Ni 4–7; Mo 1.5–2; N 0.06–0.12; Mn 0.5–1; Cu<0.3; P<0.02; S≦0.005; Al<0.02; Si≦1; the rest being iron and minor impurities, with the further requirement that the percentages of Cr, Mo and N satisfy the following formula: (Cr+3.3 Mo+16 N)≧19;

(b) carrying out a first hot deformation by forging or rolling of the ingot or the bar in order to obtain a semifinished product;

(c) warming said semifinished product to a temperature ranging from 1,250 to 1,350° C., deform it again by hot rolling or by extrusion until obtaining a product having desired shape and size;

(d) submitting the manufactured articles, optionally after cooling to room temperature, to austenization thermal treatment, keeping it at a temperature ranging from 880° C. to 980° C. for a time period ranging from 15 to 90 minutes;

(e) cooling the manufactured articles to a temperature lower than 90° C. and then submit it to tempering thermal treatment at a temperature ranging from 560° C. to 670° C. for a time ranging from 30 to 300 minutes.

3. Process as claimed in claim 2 characterized in that the cooling operation of the steps (d) and (e) is carried out in air.

4. Process as claimed in claim 2 characterized in that the cooling operation of the steps (d) and (e) is carried out in water.

5. Supermartensitic steel manufactured articles having the composition claimed in claim l, characterized in that they have been obtained by hot rolling and that they underwent a thermal treatment comprising the austenization operations at a temperature ranging from 880° C. to 980° C., the subsequent cooling to a temperature lower than 90° C. and finally the tempering at a temperature ranging from 560° C. to 670° C.

6. Manufactured articles as claimed in claim 5 characterized in that they are seamless tubes.

* * * * *

UNITED STATES PATENT AND TRADEMARK OFFICE

CERTIFICATE OF CORRECTION

PATENT NO. : 5,944,921
DATED : August 31, 1999
INVENTOR(S) : Giuseppe Cumino and Massimo Barteri It is certified that error appears in the above-identified patent and that said Letters Patent is hereby corrected as shown below:

Title page,
Item [86] should read:

-- §371 Date: Nov. 18, 1997
-- §102 (e) Date: Nov. 18, 1997 --

Signed and Sealed this

Sixteenth Day of October, 2001

*Attest:*

Nicholas P. Godici

NICHOLAS P. GODICI

*Attesting Officer* *Acting Director of the United States Patent and Trademark Office*